(12) United States Patent
Gaid

(10) Patent No.: US 8,419,947 B2
(45) Date of Patent: Apr. 16, 2013

(54) WATER TREATMENT METHOD COMPRISING A RAPID SETTLING STEP FOLLOWED BY A FILTRATION STEP DIRECTLY ON MICRO-OR ULTRA-FILTRATION MEMBRANES, AND CORRESPONDING DEVICE

(75) Inventor: Abdelkader Gaid, Saint-Maurice Cedex (FR)

(73) Assignee: Veolia Water Solution & Technologies Support, Sanit Maurice (FR)

( * ) Notice: Subject to any disclaimer, the term of this patent is extended or adjusted under 35 U.S.C. 154(b) by 1133 days.

(21) Appl. No.: 12/088,501

(22) PCT Filed: Sep. 25, 2006

(86) PCT No.: PCT/EP2006/066703
§ 371 (c)(1),
(2), (4) Date: May 21, 2008

(87) PCT Pub. No.: WO2007/039509
PCT Pub. Date: Apr. 12, 2007

(65) Prior Publication Data
US 2008/0217244 A1  Sep. 11, 2008

(30) Foreign Application Priority Data
Sep. 30, 2005  (FR) ........................ 05 10045

(51) Int. Cl.
*B01D 21/01* (2006.01)
*C02F 1/52* (2006.01)
*B03D 3/02* (2006.01)

(52) U.S. Cl.
USPC ........................................ 210/723

(58) Field of Classification Search ........... 210/636, 210/723
See application file for complete search history.

(56) References Cited

U.S. PATENT DOCUMENTS

| | | | | |
|---|---|---|---|---|
| 5,501,798 A | * | 3/1996 | Al-Samadi et al. | 210/652 |
| 5,932,099 A | * | 8/1999 | Cote et al. | 210/605 |
| 6,428,705 B1 | * | 8/2002 | Allen et al. | 210/638 |
| 2002/0011443 A1 | * | 1/2002 | Komatsu et al. | 210/650 |
| 2004/0217058 A1 | | 11/2004 | Cadera et al. | |

FOREIGN PATENT DOCUMENTS

| | | |
|---|---|---|
| JP | 05154354 | 6/1993 |
| WO | 02/42223 | 5/2002 |
| WO | 03/095371 | 11/2003 |

OTHER PUBLICATIONS

"Two years of nanofiltration at the Mery-sur-Oise plant, France", Desalination, Elsevier, Amsterdam, NL, vol. 147, No. 103, Sep. 10, 2002, pp. 69-75, XP004386411, ISSN: 0011-9164, entire document.

* cited by examiner

*Primary Examiner* — Bobby Ramdhanie
*Assistant Examiner* — Denise R Anderson
(74) *Attorney, Agent, or Firm* — Coats & Bennett, P.L.L.C.

(57) ABSTRACT

A method for treating water includes directing the water to a ballasted flocculation system and mixing a coagulant, flocculant and a ballast with the water. Solids are separated from a clarified effluent at a speed greater than 15 m/h. The method further includes filtering the clarified effluent with one or more microfiltration membranes or ultrafiltration membranes to produce filtered water. Thereafter directing the filtered water to an RO unit or a nanofiltration membrane or membranes and subjecting the filtered water to filtration by the RO unit or the nanofiltration membrane or membranes.

10 Claims, 1 Drawing Sheet

WATER TREATMENT METHOD COMPRISING A RAPID SETTLING STEP FOLLOWED BY A FILTRATION STEP DIRECTLY ON MICRO-OR ULTRA-FILTRATION MEMBRANES, AND CORRESPONDING DEVICE

This application is a U.S. National Stage application of PCT Application No. PCT/EP2006/066703, with an international filing date of Sep. 25, 2006. Applicant claims priority based on French application serial no. 05 10045 filed Sep. 30, 2005.

The field of the invention is the field of water treatment. More precisely, the invention relates to water treatment methods including a step of liquid-solid separation and at least one filtration step.

The invention applies in particular, but not exclusively, to the pretreatment of water intended to subsequently undergo a reverse osmosis or nanofiltration membrane treatment.

More generally, the invention applies in particular to:
the field of wastewater reuse for various uses (industrial process water, microelectronics industry water, water table infiltration, drinking water, etc.);
desalinization of seawater or saltwater;
the treatment of surface water with high variation in turbidity and/or organic matter;
the treatment of surface water with high variation in algae or any other organic or inorganic substances having a clogging capacity.

Conventional surface waters (river, lake or dam water) are sometimes subjected to a filtration treatment on nanofiltration membranes so as to reduce the pesticide and other organic micro-pollutants contents that can be removed by nanofiltration.

Nanofiltration also allows to remove bivalent anions, such as sulfates, as well as to reduce the content of other salts, such as nitrates, for example.

Reverse osmosis uses membranes similar to those of nanofiltration, but with a higher separation power. It allows to remove almost all of the organic and inorganic pollutants from the water. Reverse osmosis is used in particular in the production of water for human consumption or process or boiler water from seawater or saltwater.

Reverse osmosis is also increasingly used as a treatment when reusing wastewater in order to produce process water after it has passed through a wastewater treatment plant.

Reverse osmosis membranes, like those of nanofiltration, are highly sensitive to clogging and require a water pretreatment in order to reduce the clogging capacity. The clogging capacity of water intended for nanofiltration or reverse osmosis is often measured by its Silt Density Index (SDI), which is normally intended to be limited by the pretreatments to the lowest possible value, and, in any case, to a value below or equal to 4 (SDI≦4).

Indeed, high SDI values, above 4, for example, lead to excessive clogging of the reverse osmosis or nanofiltration membranes, requiring frequent chemical washing of the membranes, thereby reducing their lifetime.

The pretreatments currently used upstream of the reverse osmosis and nanofiltration membrane treatments usually combine a liquid-solid separation at low speed (simple or lamellar settling, or floatation, at speeds below 15 m/h) with sand and/or carbon filtration.

Flocculation coagulation is frequently performed upstream of the liquid-solid separation.

However, the SDI of water pretreated by these conventional techniques often fluctuates, in a way that is difficult to control and it is difficult to continuously maintain it at a value below or equal to 4.

Moreover, the conventional pretreatments require bulky equipment (settling at less than 15 m/h, filtration on granular material in one stage, and sometimes even two stages), and do not continuously produce, or produce with difficulty, the desired SDI values of below 4.

The invention aims in particular to overcome the disadvantages of the prior art.

More precisely, the invention aims to propose a treatment method that allows to better control the clogging index (or SDI) of the treated water compared with the solutions of the prior art, that is, to reduce this index with respect to that obtained with known techniques.

The invention also aims to provide such a method that allows to reduce the bulk of the corresponding equipment.

The invention also aims to propose a device for implementing a method according to the invention.

Another objective of the invention is to propose such a method and such a device with a simple design and which are easy to implement.

These objectives, as well as others, which will appear below, are achieved by the invention, which relates to a water treatment method including a step of liquid-solid separation followed by at least one filtration step, characterized in that said liquid-solid separation step includes a settling step performed at a superficial speed greater than 15 m/h, and in that said filtration step is performed directly on at least one microfiltration or ultrafiltration membrane.

It is understood that, according to the invention, the fact that the filtration step is performed "directly" on membranes means that no massive inert granular filtration is performed upstream of the ultra or microfiltration step.

The invention therefore contradicts what was previously believed by a person skilled in the art, namely that a sufficiently low SDI can be obtained, in a pretreatment, only with slow settling, and by combining this settling with a sand and/or carbon filtration.

However, the applicant discovered unexpectedly that the use of rapid liquid-solid separation techniques, performed at speeds above 15 m/h, capable of reaching more than 30 m/h, and even 90 to 200 m/h, followed, without the interposition of a preliminary sand or anthracite filtration, by direct filtration on micro or ultrafiltration membranes, could allow, compactly and economically, to continuously obtain water with an SDI below 4, and even reaching values below 3 or even 2.

The invention overcomes the two defects of the prior art, including:
the lack of compactness due to the combination of settlers operating at speeds below 15 m/h with one or more steps of filtration on granular material (usually sand or sand-anthracite combination);
the difficulty of continuously obtaining an SDI below 4.

According to a first embodiment, said liquid-solid separation step is performed by ballasted floc settling of fine inert granular material with a density higher than that of water.

In this case, said ballasted floc settling step is preferably performed using fine sand.

The tests performed by the applicant indeed showed that SDIs below 4, often even below 2, were continuously obtained for water pretreated with a first liquid-solid separation step performed at more than 15 m/h in ballasted sludge floc settlers of the type described in the patent applications published under numbers FR-2 553 082 and U.S. Pat. No. 4,388,195, but also at more than 30 m/h by floatation and from 30 to 90 m/h and faster when using ballasted floc settlers of the type described in the patents published under numbers FR-2 627 704 and FR-2 719 234, then a second microfiltration (MF) or ultrafiltration (UF) step in pressurized or immersed modules.

According to a second embodiment, said liquid-solid separation step is performed by flotation.

According to a third embodiment, said liquid-solid separation step is performed by ballasted floc settling with sludge recirculation.

According to an advantageous solution, the method includes at least one step of declogging said membrane(s), in which the declogging water is recycled upstream of said liquid-solid separation step.

According to a possible alternative, the method includes a step of injecting into said water, during said liquid-solid separation step, at least one of the reagents belonging to the following group:
organic coagulant;
inorganic coagulant;
organic flocculent;
inorganic flocculant;
organic absorbent;
inorganic absorbent.

According to another advantageous alternative, the method includes at least one step of injecting into said water, between said liquid-solid separation step and said membrane filtration step, at least one oxydative reagent.

In this case, said oxydative reagent(s) include at least one of the reagents belonging to the following group:
ozone;
chlorinated oxidants;
hydrogen peroxide.

According to yet another advantageous alternative, the method includes a UV treatment step performed between said liquid-solid separation step and said membrane filtration step.

According to another alternative, the method includes at least one step of injecting into said water, between said liquid-solid separation step and said membrane filtration step, active carbon powder.

The method preferentially includes a step of treatment by reverse osmosis performed downstream of said membrane filtration step.

The method includes a nanofiltration step performed downstream of said membrane filtration step.

The invention also relates to a water treatment device including liquid-solid separation means and filtration means, characterized in that said liquid-solid separation means include at least one settler operating at a superficial speed greater than 15 m/h, which filtration means include first filtration means provided so that a first filtration step after said liquid-solid separation step is performed using at least one microfiltration or ultrafiltration membrane.

According to a first embodiment, said liquid-solid separation means include means for injecting a coagulant, at least one flocculation tank associated with means for injecting fine sand into or upstream of said flocculation tank, at least one settling tank associated with means for extracting settled water, and means for extracting clarifier sludge.

In this case, the device preferentially includes means for recirculating a mixture of said clarified sludge and said sand in or upstream of said flocculation tank.

According to a second embodiment, said liquid-solid separation means include at least one floatation tank associated with at least one micro-bubble production device.

The device preferentially includes means for injecting water for declogging said membrane(s) and means for recirculating said declogging water at the level of or upstream of said liquid-solid separation means.

According to an advantageous solution, the device includes ozone injection means downstream or upstream of said liquid-solid separation means.

The device advantageously includes means for reverse osmosis filtration means or nanofiltration means downstream of said first filtration means.

According to an advantageous solution, the device includes means for bypassing said liquid-solid separation means.

According to another advantageous solution, the device includes means for bypassing said ozone injection means.

It is thus possible to perform a direct ultra or microfiltration treatment if the variable quality of the raw water enables such a direct membrane treatment with or without the injection of a coagulant or flocculant.

Other features and advantages of the invention will become more clear on reading the following description of two preferred embodiments of the invention, given as illustrative but non-limiting examples, and appended drawings in which.

As indicated above, the principle of the invention consists in pre-treating water using a method including at least one liquid-solid separation step followed by at least one filtration step on micro or ultrafiltration membranes, wherein the liquid-solid separation step is performed at a superficial speed greater than 15 m/h and no inert granular mass filtration is performed upstream of said ultra or microfiltration step.

Depending on the nature and the composition of the raw water to be treated, the pretreatment is improved by adding one or more reagents from the following:

inorganic coagulant, such as an iron or aluminum salt, or organic coagulant, such as polymers including poly(diallyldimethyl ammonium chloride (cationic organic polymer), mainly upstream of the liquid-solid separation, but also, optionally, upstream of the MF or UF membranes;

organic flocculant, such as acrylic polymers, for example, but also inorganic flocculant, such as clay, mainly upstream of the liquid-solid separation;

oxidative reagent or disinfectant (preferentially ozone, but also chlorine and derivatives thereof, hydrogen peroxide, or even UV radiation) between the liquid-solid separation and the MF or UF filtration;

organic or inorganic absorbent, such as active carbon powder, either upstream of the liquid-solid separation, or between said separation and the MF or UF membrane step.

These reagents are used mainly in the following cases:

the coagulants and flocculants will be used for water with high concentrations of organic materials, colloids or particles in suspension;

the ozone will be used in the case of raw water with algae, plankton, or other living micro-organisms, for example in the algal growth phase, as well as in the case of water with iron or manganese concentrations or turbid water;

the active carbon powder will be used in the case of water with high hydrocarbon concentrations and dissolved micro-pollutants, affecting the clogging capacity of the water.

The method also enables micro or ultrafiltration membranes to be declogged, and the declogging water is preferentially recirculated at the head of the liquid-solid separation device.

A final possible step of reverse osmosis or nanofiltration is performed downstream of the micro or ultrafiltration step, on pretreated water, thus exhibiting continuously a SDI below 4.

Figure 1:
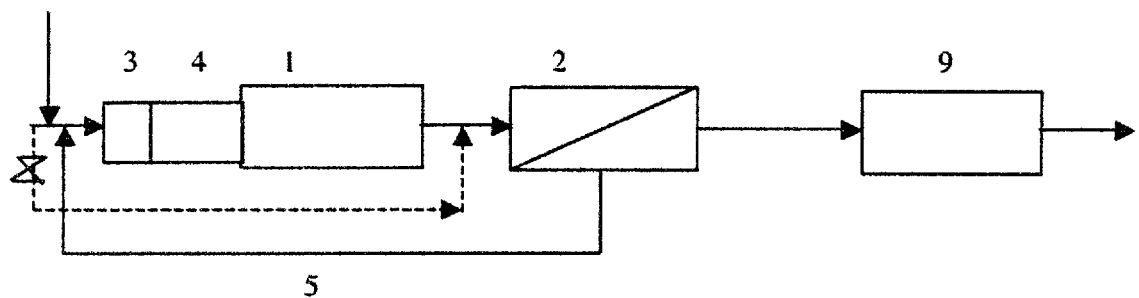
FIG. 1 is a schematic view of a first embodiment of the invention according to a simplified version.

According to a simplified version as shown in FIG. 1, a device for implementing the method as described above includes high-speed (greater than 15 m/h) liquid-solid separation means 1, chosen among the simple or lamellar settling techniques, or flotation, followed by filtration 2 on micro or ultrafiltration membranes.

Preferentially, means for injecting a coagulant 3 and a flocculant 4 are provided upstream of the liquid-solid separation step.

Means 5 for recycling the water for declogging the membranes are present upstream of the liquid-solid separation step so as to minimize the loss of water.

Figure 2:
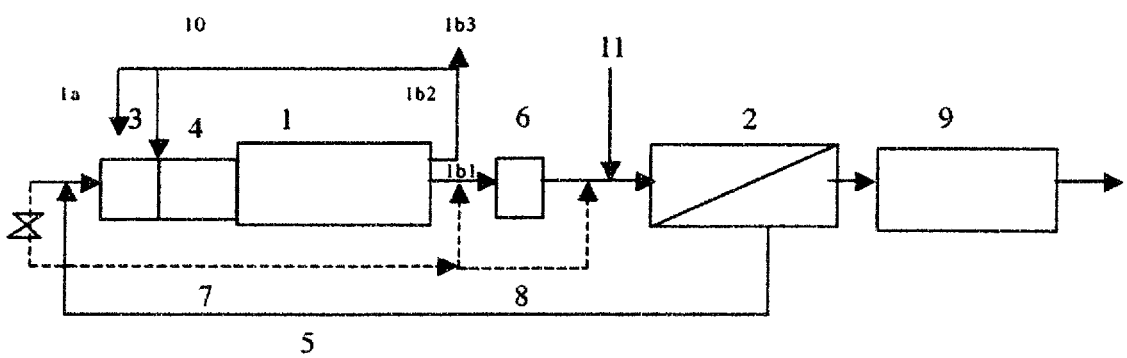
FIG. 2 is a schematic view of a second embodiment of the invention according to a preferred version.

In the preferred version schematically shown in FIG. 2, the invention includes means for coagulation 3, flocculation 4 and micro-sand ballasted floc settling 1 at a settling speed ranging between 15 and 200 m/h, preferentially between 30 and 90 m/h.

The liquid-solid separation means include a settling tank 1, downstream the flocculation tank 4, which settling tank is associated with means for extracting settled water 1b1 and means for extracting clarifier sludge 1b2 provided so as to ensure recirculation of the clarified sludge/sand mixture in the tank 4 (or upstream thereof) and extraction of the sludge 1b3 to the sludge treatment. Downstream of the flocculation and settling tanks, ozone injection means 6 are provided for injection at a rate of between 0.5 and 5 mg O3/l, then means are provided for filtration on ultra or microfiltration membranes, which declogging water is returned by the recycling circuit 5 at the head of the flocculation-settling.

The flotation tank preferentially integrates a micro-bubble production device.

The treatment system will preferably be equipped with circuits for bypassing 7 the liquid-solid separation step and 8 the optional ozonation step, so as to allow a direct ultra or microfiltration treatment, if the variable quality of the raw water allows such a direct membrane treatment, with or without the injection of coagulant or flocculent.

Chemical reagents can be injected at the head of the liquid-solid separation using injection means 10.

Active carbon powder can also be injected at the head of the liquid-solid separation by injection means 10 or 11, between the liquid-solid separation and the ultra or microfiltration step.

The treatment is complemented, if this is the final objective of the treatment, by a reverse osmosis membrane filtration or nanofiltration treatment 9.

Tests were carried out with the method and the device described above.

The results, summarized in table 1, are as follows.

Raw surface water, colored and organic, with a turbidity that reached up to 2000 NTU during the tests and of which the 5-minute SDI was greater than 15, was sent through a first step of coagulation (with aluminum sulfate at 10-12 mg Al/liter of water), flocculation, and settling using sand ballast in an ACTIFLO (registered trademark) ballasted floc settler.

The clarified water, with a turbidity below 5 NTU and a 15-minute SDI below 6, was then sent to a microfiltration module with a cutoff of 0.1 µm. The water leaving the microfiltration had a turbidity below 0.2 NTU, and continuously exhibited a SDI below 4.

TABLE 1

|  | Raw water | Clarified water | Microfiltered water |
|---|---|---|---|
| Turbidity NTU | 1-2000 | <5 | <0.2 |
| COLOR MG/l Pt/Co | 5-200 | <5-10 | <5 |
| M.O. Oxid KMnO4 mg/l | 2-15 | 1-5 | <5 |
| SDI | >15 (5 min) | <6 (15 min) | <4 |

Complementary tests (summarized in table 2) were carried out by adding an ozonation step after the "ACTIFLO" clarification step.

While the number of particles in the raw water was greater than 2000 u/ml, and in the clarified water was below 500 u/ml, ozonation allows to maintain the number of particles between 50 and 100 u/ml in the ozonated clarified water, corresponding to a 15-minute SDI below 5 (instead of 6 for clarified water without ozonation).

It is noteworthy that the SDI obtained after microfiltration of the ozonated clarified water was below 3 (value below SDI<4 obtained without ozonation).

TABLE 2

|  | Raw water | Clarified water | Microfiltered water |
|---|---|---|---|
| Number of particles u/ml | >2000 | <500 | <50-100 |
| SDI | >15 (5 min) | <6 (15 min) | <5 (15 min) |

The invention claimed is:

1. A method of treating water, comprising:
directing the water to a ballasted flocculation system;
mixing a coagulant with the water;
mixing a flocculent with the water;
adding a ballast to the water;
mixing the ballast with the water and wherein the ballast forms floc in the water;
settling the floc containing the coagulant, flocculent, and the ballast in a settling tank at a speed greater than 15 m/h such that the floc is separated from a clarified effluent;
filtering the effluent with one or more micro filtration membranes or ultra filtration membranes and producing filtered water; and
directing the filtered water to a reverse osmosis unit or a nano filtration membrane and subjecting the filtered water to filtration by the reverse osmosis unit or the nano filtration membrane.

2. The method of claim 1 wherein the ballast is sand.

3. The method of claim 1 wherein the floc form sludge and wherein the sludge is recycled and mixed with the water to be treated by the ballasted flocculation system.

4. The method of claim 1 including declogging the micro or ultra filtration membranes and producing declogging water and recycling the declogging water to a point upstream from the settling tank.

5. The method of claim 1 including injecting at least one oxidizing reagent into the water at a point between the settling tank and the micro or ultra filtration membranes.

6. The method of claim 5 including selecting the oxidizing reagent from the group including ozone, chlorinated oxidants, and hydrogen peroxide.

7. The method of claim 1 including exposing the water to ultraviolet (UV) energy at a point between the settling tank and where the liquid effluent is filtered by the micro or ultra filtration membranes.

8. The method of claim 1 including injecting active carbon powder into the water downstream from the settling tank and upstream from the filtration by the micro or ultra filtration membranes.

9. The method of claim 1 wherein the filtered water includes a silt density index no greater than 4.

10. A method of treating water, comprising:
   directing the water to a flotation system;
   mixing a coagulant with the water;
   mixing a flocculent with the water;
   wherein mixing the coagulant and flocculent with the water forms flocs in the water;
   separating the floc from water at a speed greater than 15 m/h in the flotation system such that the floc are directed to the surface of the water and an effluent liquid is produced;
   filtering the effluent liquid with one or more micro-filtration membranes or ultra-filtration membranes and producing filtered water; and
   directing the filtered water to a reverse osmosis unit or a nano-filtration membrane and subjecting the filtered water to filtration by the reverse osmosis unit or the nano-filtration membrane.

* * * * *